(12) United States Patent
Makeev et al.

(10) Patent No.: US 11,375,198 B2
(45) Date of Patent: Jun. 28, 2022

(54) PROCESSING SIGNAL DATA USING AN UPSAMPLING ADJUSTER

(71) Applicant: V-NOVA INTERNATIONAL LIMITED, London (GB)

(72) Inventors: Ivan Makeev, London (GB); Michele Sanna, London (GB); Balázs Keszthelyi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 16/769,801

(22) PCT Filed: Dec. 6, 2018

(86) PCT No.: PCT/GB2018/053553
§ 371 (c)(1),
(2) Date: Jun. 4, 2020

(87) PCT Pub. No.: WO2019/111011
PCT Pub. Date: Jun. 13, 2019

(65) Prior Publication Data
US 2021/0185320 A1    Jun. 17, 2021

(30) Foreign Application Priority Data

Dec. 6, 2017 (GB) ..................... 1720365

(51) Int. Cl.
*H04N 19/132* (2014.01)
*H04N 19/136* (2014.01)
(Continued)

(52) U.S. Cl.
CPC ............. *H04N 19/132* (2014.11); *G06N 3/04* (2013.01); *G06N 3/08* (2013.01); *H04N 19/136* (2014.11)

(58) Field of Classification Search
USPC ..................................................... 375/240.01
See application file for complete search history.

(56) References Cited

U.S. PATENT DOCUMENTS 10,735,024 B2 * 8/2020 Handford ............. H04N 19/137
11,012,088 B2 * 5/2021 Handford ............. H04N 19/176
(Continued)

OTHER PUBLICATIONS

Fengmei et al., "An Image Interpolation Scheme Combined with Artificial Neural Network", Natural Computation, 2007, ICNC 2007, Third International Conference On, IEEE, Piscataway, NJ, USA, Aug. 24, 2007, pp. 99-102, XP031335459, ISBN: 978-0-7695-2875-5.
(Continued)

*Primary Examiner* — Behrooz M Senfi
(74) *Attorney, Agent, or Firm* — Workman Nydegger

(57) ABSTRACT

Signal data is processed at an encoder device. A representation of a signal at a first level of quality is obtained. The representation at the first level is upsampled using an upsampler in the encoder device to derive a preliminary representation of the signal at a second, higher level of quality. Adjustment data is derived using the representation at the first level as an input to an upsampling adjuster arranged in parallel with the upsampler in the encoder device. The adjustment data is useable by the encoder device to adjust the preliminary representation. The preliminary representation and the adjustment data are used to derive an adjusted representation of the signal at the second level. Residual data useable by a decoder device is derived, using the adjusted representation, to reconstruct a reference representation of the signal at the second level using the adjusted representation.

13 Claims, 6 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 11,039,154 | B2* | 6/2021 | Damnjanovic | H04N 19/18 |
| 2013/0294495 | A1* | 11/2013 | Rossato | H04N 19/463 |
| | | | | 375/240.01 |
| 2016/0366449 | A1* | 12/2016 | Stessen | H04N 19/85 |
| 2017/0256033 | A1* | 9/2017 | Tuzel | G06K 9/00255 |
| 2017/0372717 | A1* | 12/2017 | Peterson | G06F 3/165 |
| 2018/0174275 | A1* | 6/2018 | Bourdev | H04N 19/197 |
| 2018/0176588 | A1* | 6/2018 | Alshina | H04N 19/186 |
| 2019/0312585 | A1* | 10/2019 | Handford | H04N 19/30 |

OTHER PUBLICATIONS

International Search Report and Written Opinion for PCT/GB2018/053553 dated Mar. 14, 2019.

Nie et al., "Face Hallucination via Convolution Neural Network", 2016 IEEE 28th International Conference on Tools with Artificial Intelligence (ICTAI), IEEE, Nov. 6, 2016, pp. 485-489, XP033042104, DOI: 10.1109/ICTAI.2016.0080.

* cited by examiner

PROCESSING SIGNAL DATA USING AN UPSAMPLING ADJUSTER

The present application is a 371 US Nationalization of International Patent Application No. PCT/GB2018/053553, filed Dec. 6, 2018, which claims priority to United Kingdom Patent Application No. 1720365.4, filed Dec. 6, 2017, the entire disclosures of which are incorporated herein by reference.

TECHNICAL FIELD

The present invention relates to processing signal data using an upsampling adjuster.

BACKGROUND

Compression and decompression of signals is an important consideration in many known systems.

Many types of signal, for example video, images, audio or volumetric signals, may be compressed and encoded for transmission, for example over a data communications network. Other signals may be stored in a compressed form, for example on a storage medium such as a Digital Versatile Disc (DVD). When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at different levels of quality, depending on the capabilities of the decoder and the available bandwidth. However, relatively large amounts of information may need to be stored and/or transmitted, particularly as the usage of higher quality, higher definition video becomes more widespread.

Some known scalable encoding systems use an upsampler to upsample signal data. There may be differences, however, between the upsampled data and the original signal. Inefficiencies may result in relation to encoding data used by a decoder to reconstruct the original signal.

SUMMARY

According to a first aspect of the present invention, there is provided a method of processing signal data at an encoder device, the method comprising:

obtaining a representation of a signal at a first level of quality;

upsampling the representation at the first level of quality using an upsampler in the encoder device to derive a preliminary representation of the signal at a second, higher level of quality;

deriving adjustment data using the representation at the first level of quality as an input to an upsampling adjuster arranged in parallel with the upsampler in the encoder device, the adjustment data being useable by the encoder device to adjust the preliminary representation;

using the preliminary representation and the adjustment data to derive an adjusted representation of the signal at the second level of quality; and deriving, using the adjusted representation, residual data useable by a decoder device to reconstruct a reference representation of the signal at the second level of quality using the adjusted representation.

According to a second aspect of the present invention, there is provided a method of processing signal data at a decoder device, the method comprising:

obtaining a representation of a signal at a first level of quality;

upsampling the representation at the first level of quality using an upsampler in the decoder device to derive a preliminary representation of the signal at a second, higher level of quality;

deriving adjustment data using the representation at the first level of quality as an input to an upsampling adjuster arranged in parallel with the upsampler in the decoder device, the adjustment data being useable by the decoder device to adjust the preliminary representation;

using the preliminary representation and the adjustment data to derive an adjusted representation of the signal at the second level of quality;

receiving data useable by the decoder device to derive residual data useable by the decoder device to reconstruct a reference representation of the signal at the second level of quality using the adjusted representation;

deriving the residual data using the received data; and reconstructing the reference representation using the adjusted representation and the residual data.

According to a third aspect of the present invention, there is provided a method of processing signal data at an encoder device, the method comprising:

obtaining a representation of a signal at a first level of quality;

upsampling the representation at the first level of quality using a first upsampler in the encoder device to derive a first preliminary representation of the signal at a second, higher level of quality;

deriving first adjustment data using the representation at the first level of quality as an input to a first upsampling adjuster arranged in parallel with the first upsampler in the encoder device, the first adjustment data being useable by the encoder device to adjust the first preliminary representation;

using the first preliminary representation and the first adjustment data to derive a first adjusted representation of the signal at the second level of quality;

deriving, using the first adjusted representation, first residual data useable by a decoder device to reconstruct a reference representation of the signal at the second level of quality using the first adjusted representation;

using the first adjusted representation and the first residual data, reconstructing the reference representation at the second level of quality;

upsampling the reference representation at the second level of quality using a second upsampler in the encoder device to derive a second preliminary representation of the signal at a third level of quality, higher than the second level of quality;

deriving second adjustment data using the reference representation at the second level of quality and data output from the first upsampling adjuster as inputs to a second upsampling adjuster arranged in parallel with the second upsampler in the encoder device, the second adjustment data being useable by the encoder device to adjust the second preliminary representation;

using the second preliminary representation and the second adjustment data to derive a second adjusted representation of the signal at the third level of quality; and deriving, using the second adjusted representation, second residual data useable by a decoder device to reconstruct a reference representation of the signal at the third level of quality using the second adjusted representation.

According to a fourth aspect of the present invention, there is provided a method of processing signal data at a decoder device, the method comprising:

obtaining a representation of a signal at a first level of quality;

upsampling the representation at the first level of quality using a first upsampler in the decoder device to derive a first preliminary representation of the signal at a second, higher level of quality;

deriving first adjustment data using the representation at the first level of quality as an input to a first upsampling adjuster arranged in parallel with the first upsampler in the decoder device, the first adjustment data being useable by the decoder device to adjust the first preliminary representation;

using the first preliminary representation and the first adjustment data to derive a first adjusted representation of the signal at the second level of quality;

receiving first data useable by the decoder device to derive first residual data useable by the decoder device to reconstruct a reference representation of the signal at a second, higher level of quality using the first adjusted representation;

deriving the first residual data using the received first data;

reconstructing the reference representation at the second level of quality using the first adjusted representation and the first residual data;

upsampling the reference representation at the second level of quality using a second upsampler in the decoder device to derive a second preliminary representation of the signal at a third level of quality, higher than the second level of quality;

deriving second adjustment data using the reference representation at the second level of quality and data output from the first upsampling adjuster as inputs to a second upsampling adjuster arranged in parallel with the second upsampler in the decoder device, the second adjustment data being useable by the decoder device to adjust the second preliminary representation;

using the second preliminary representation and the second adjustment data to derive a second adjusted representation of the signal at the third level of quality;

receiving second data useable by the decoder device to derive second residual data useable by the decoder device to reconstruct a reference representation of the signal at the third level of quality using the second adjusted representation;

deriving the second residual data using the received second data; and reconstructing the reference representation at the third level of quality using the second adjusted representation and the second residual data.

According to a fifth aspect of the present invention, there is provided an apparatus arranged to perform a method according to any of the first, second, third or fourth aspects of the present invention.

According to a sixth aspect of the present invention, there is provided a computer program comprising instructions which, when executed, cause an apparatus to perform a method according to any of the first, second, third or fourth aspects of the present invention.

DETAILED DESCRIPTION

Figure 1:
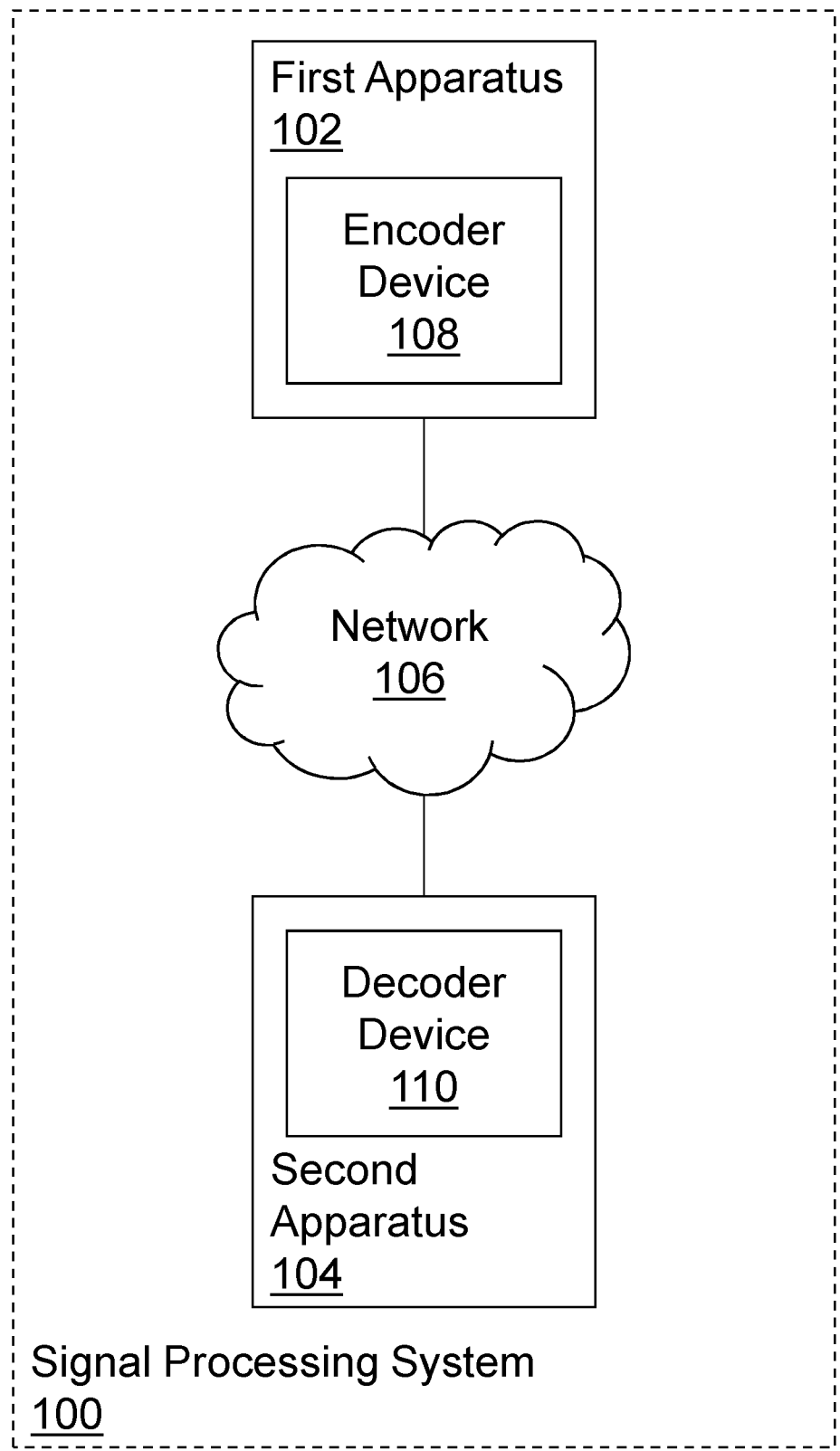
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus. The first apparatus 102 and/or second apparatus 104 may comprise one or more components. The components may be implemented in hardware and/or software. The one or more components may be co-located or may be located remotely from each other in the signal processing system 100. Examples of types of apparatus include, but are not limited to, computerised devices, routers, workstations, handheld or laptop computers, tablets, mobile devices, games consoles, smart televisions, set-top boxes, etc. . . .

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder device 108. The encoder device 108 is configured to encode signal data. The encoder device 108 may perform one or more further functions in addition to encoding signal data. The encoder device 108 may be embodied in various different ways. For example, the encoder device 108 may be embodied in hardware and/or software.

The second apparatus 104 comprises a decoder device 110. The decoder device 110 is configured to decode signal data. The decoder device 110 may perform one or more further functions in addition to decoding signal data. The decoder device 110 may be embodied in various different ways. For example, the decoder device 110 may be embodied in hardware and/or software.

The encoder device 108 encodes signal data and transmits the encoded signal data to the decoder device 110 via the data communications network 106. The decoder device 110 decodes the received, encoded signal data and generates decoded signal data. The decoder device 110 may output the decoded signal data, or data derived using the decoded signal data. For example, the decoder device 110 may output such data for display on one or more display devices associated with the second apparatus 104.

In some examples described herein, the encoder device 108 transmits information the decoder device 110 can use to reconstruct a representation of the signal at one or more higher levels of quality. Such information may be referred to as "reconstruction data". In some examples, "reconstruction" of a representation involves obtaining a representation that is not an exact replica of an original representation. The extent to which the representation is the same as the original representation may depend on various factors including, but not limited to, quantisation levels. A representation of a signal at a given level of quality may be considered to be a rendition, version or depiction of data comprised in the signal at the given level of quality. In some examples, the reconstruction data is included in the signal data that is encoded by the encoder device 108 and transmitted to the decoder device 110. For example, the reconstruction data may be in the form of metadata. In some examples, the reconstruction data is encoded and transmitted separately from the signal data. Reconstruction data is an example of compression data. Compression data may comprise data associated with a compressed data stream.

The information the decoder device 110 uses to reconstruct the representation of the signal at the one or more higher levels of quality may comprise residual data, as described in more detail below. Residual data is an example of reconstruction data. The reader is referred to international patent application no. PCT/EP2013/059847, which published as WO2013/171173. PCT/EP2013/059847 describes the use of residual data in a tiered hierarchy. The entire contents of PCT/EP2013/059847 are incorporated herein by reference. Further, for further details of hierarchical approaches to encoding and decoding which are consistent with the use envisaged by the present invention the reader is referred to U.S. Pat. Nos. 8,977,065, 8,948,248, 8,711,943, 9,129,411, 8,531,321, 9,510,018, 9,509,990, which are incorporated herein by reference.

Compared to some known techniques, examples described herein involve transmitting a relatively small amount of information to be used for such reconstruction. This reduces the amount of data transmitted via the data communications network 106 compared to some known techniques. The savings may be particularly relevant where the signal data corresponds to high quality video data, where the amount of information transmitted in known systems can be especially high.

In examples described herein, measures are provided to allow residual data to have desired one or more attributes. For example, it may be desired to reduce a size of residual data below a target size and/or to configure residual data for efficient encoding. As such, examples described herein allow residual data and/or encoding of residual data to be controlled in a flexible manner.

Figure 2:
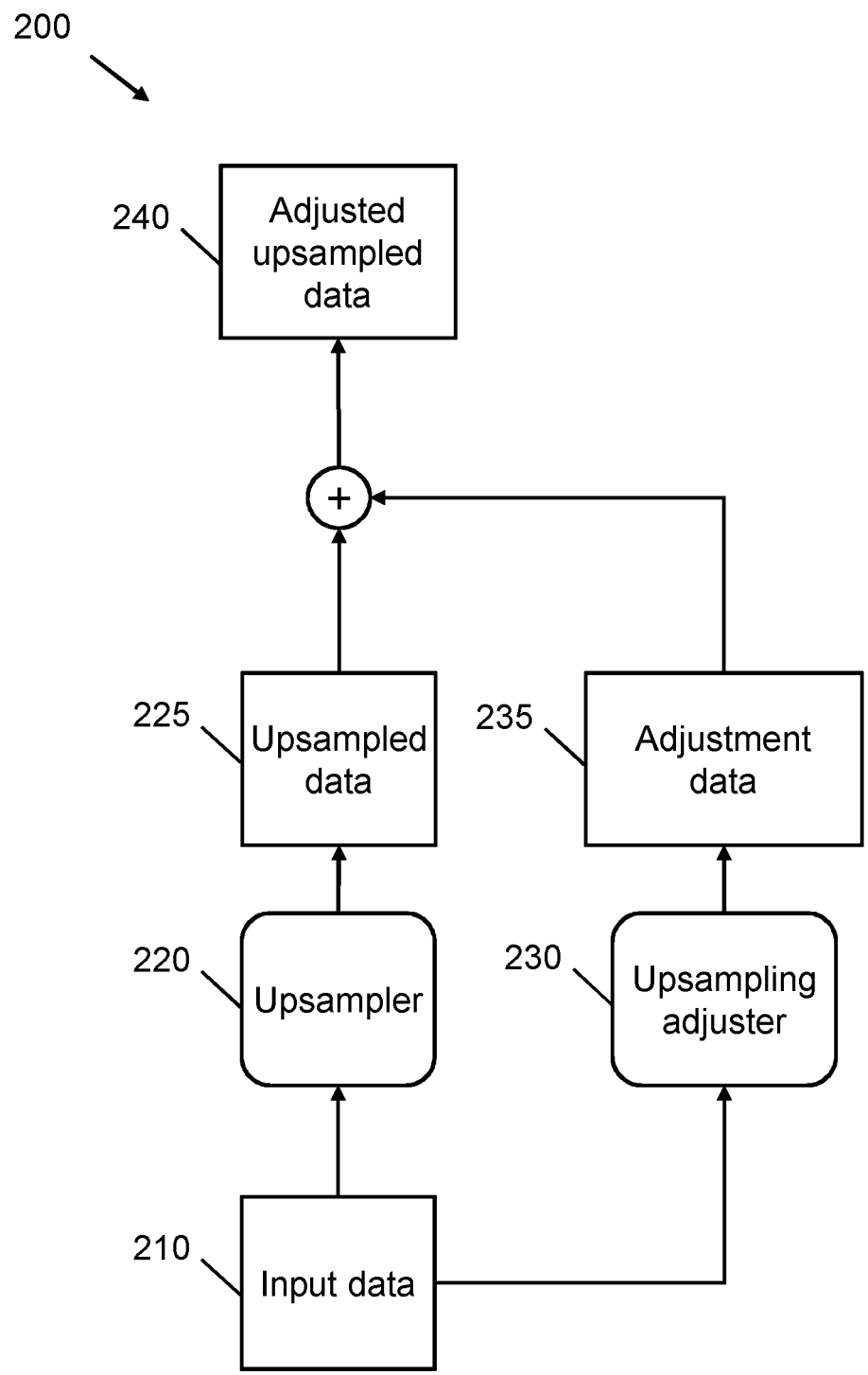
FIG. 2 shows a schematic diagram of an example of a signal processing technique in accordance with an embodiment of the present invention.

Referring to FIG. 2, there is shown schematically an example of a signal processing technique 200. The signal processing technique 200 may be performed by the encoder device 108 and/or the decoder device 110.

Input data 210 is obtained. The input data 210 may be derived by the apparatus performing the signal processing technique 200, for example the encoder device 108 or the decoder device 110, or the input data 210 may be received from one or more other entities. For example, when the signal processing technique 200 is performed by the decoder device 110, the decoder device 110 may generate the input data as a representation of the signal at a lower level of quality and use it as input data 210 in processing 200. Alternatively, the decoder device 110 may receive the input data 210 from the encoder device 108 and/or from another entity, such as an intermediary device which relays the input data 210 to the decoder device 110. The input data 210 may be received via a compressed data stream.

The input data 210 comprises a representation of a signal at a first level of quality. For example, the input data 210 may comprise image data having a given resolution. The first level of quality may be a given level of quality in a tiered hierarchy comprising multiple different levels of quality. The first level of quality may be the lowest level of quality in the tiered hierarchy or may be an intermediate level of quality between the highest and lowest levels of quality in the tiered hierarchy. The reader is referred to international patent application no. PCT/EP2013/059847, which describes a tiered hierarchy of levels of quality.

The obtained input data 210 may be derived using a reference representation of the signal at a second level of quality. The input data 210 may be derived by the apparatus performing the signal processing technique 200 or the input data may be derived by one or more other entities. The second level of quality is higher than the first level of quality. For example, the second level of quality may be a separate, higher level of quality relative to the first level of quality in the tiered hierarchy. The second level of quality may be the highest level of quality in the tiered hierarchy or may be an intermediate level of quality between the highest and lowest levels of quality in the tiered hierarchy. The input data 210 may be derived by performing a downsampling operation on the reference representation at the second level of quality.

The input data 210 is upsampled using an upsampler 220. The upsampler 220 may be a physical or logical component of the apparatus performing the signal processing technique 200. The upsampler 220 may be configured with one or more predetermined upsampling functions. Examples of upsampling functions include, but are not limited to, nearest-neighbour interpolation, bilinear interpolation and bicubic interpolation.

The upsampler 220 upsamples the input data 210 to derive upsampled data 225. The upsampled data 225 is a preliminary representation of the signal at the second level of quality.

The input data 210 is also used as an input to an upsampling adjuster 230. In this example, the upsampling adjuster 230 is arranged in parallel with the upsampler 220. The term "in parallel" is used herein to denote that the upsampling adjuster 230 and the upsampler 220 receive a common input, namely the input data 210. The upsampling adjuster 230 is used to derive adjustment data 235. The adjustment data 235 is useable to adjust the upsampled data 225 derived by the upsampler 220.

In some examples, the upsampling adjuster 230 comprises an upsampling compensator. An upsampling compensator allows for an upsampling property of the upsampler 220 to be compensated. Such an upsampling property may be an undesired property of the upsampler 220 and/or of the upsampled data 225 derived by the upsampler 220. For example, the upsampling property may relate to an unwanted artefact in the upsampled data 225. The upsampling property may be compensated by adjusting the upsampled data 225 using the adjustment data 235.

In some examples, the upsampling adjuster 230 comprises an upsampling enhancer. An upsampling enhancer allows the output from the upsampler 220 to be enhanced. "Enhancement" as described herein may be distinguished from "compensation", in that the former relates to improving a particular upsampling property and the latter relates to compensating for a particular upsampling property, e.g. an undesired property. For example, a visual quality of the upsampled data 220 may be improved through the use of the upsampling adjuster 230. The output from the upsampler 220 may be enhanced by adjusting the upsampled data 225 using the adjustment data 235.

The upsampling adjuster 230 may be a physical or logical component of the apparatus performing the signal processing technique 200. In this example, the upsampling adjuster 230 and the upsampler 220 are separate components, arranged in parallel. In other examples, the upsampling adjuster 230 and the upsampler 220 are comprised in a single component.

In some examples, the upsampling adjuster 230 uses machine learning to derive the adjustment data 235. For example, the upsampling adjuster 230 may be trained using one or more training datasets in an "offline" mode. The knowledge obtained during training can then be used by the upsampling adjuster 230 to derive the adjustment data 235. Using machine learning techniques to derive the adjustment data 235 used to adjust the upsampled data 225 improves the accuracy of the adjusted upsampled data 240 compared to a case in which machine learning techniques are not used. The accuracy of the adjusted upsampled data 240 may relate to how similar the adjusted upsampled data 240 is to the reference representation. By improving the accuracy of the adjusted upsampled data 240, coding efficiency of the residual data may be improved. For example, the size of the residual data and/or an entropy associated with coding the residual data may be reduced.

In some examples, the upsampling adjuster 230 comprises a trained artificial neural network. An example of such a trained artificial neural network is a convolutional neural network. A convolutional neural network is a type of deep, feed-forward artificial neural network. A convolutional neural network may comprise convolution layers and pool layers. A convolutional neural network may provide higher accuracy than other types of neural network, particularly in image processing applications. There may be a trade-off, however, between accuracy and processing resources. Some other types of neural network may, for example, use fewer processing resources than a convolutional neural network, e.g. a single or multi-layer perceptron network, at the expense of accuracy.

An example of an artificial neural network that is designed to handle images may model a function having a form of $F(x, \theta_i)=y$, where x is an input image, $\theta_i$ are parameters optimised through training the network, and y is an output. The function F may be linear or non-linear. The input image x may have dimensions h×w. In an example, the output y has dimensions 2h×2w, it being understood that y may have other dimensions in other examples. As such, the function F may be considered an upsampler function, since the output is an image having at least one greater dimension than the input image.

The network may be trained using a training dataset comprising a plurality of training images. For N training images, the training dataset comprises $\{(x_t, y_t)\}_{t=1}^{N}$, where $x_t$ is a training image and $y_t$ is an intended or "ground truth" output. For $y_t$, an original image at a higher level of quality may be used, such as the reference representation at the second level of quality. $x_t$ is a yet to be upsampled version of $y_t$, which could also be referred to as a downsampled version of $y_t$. The network attempts to reconstruct $y_t$. Training involves calculating losses and updating parameters of the network accordingly. A loss function is used to find the parameters $\theta_i$ that minimise the error $E=\|F(x_t, \theta_i)-y_t\|$. In other words, the network's output for a training image is compared against the intended output for that image. The network also uses hyper-parameters which are set before the parameters $\theta_i$ are optimised. Hyper-parameters may specify the structure of the network itself and/or how the network is trained and/or used. Hyper-parameters may be fixed during training of the network.

In some examples, alternatively or additionally to an artificial neural network, the upsampling adjuster 230 comprises a lookup table. The lookup table may comprise one or more predetermined sets of adjustment data associated with different upsampling and/or image attributes. A lookup table may be easier to implement than an artificial neural network as it does not require training. However, a lookup table may be less accurate and/or reliable than an artificial neural network in adjusting the upsampled data 225.

The upsampled data 225 and the adjustment data 235 are used to derive adjusted upsampled data 240. The adjusted upsampled data 240 comprises an adjusted representation of the signal at the second level of quality. In some examples, the adjustment data 235 is used to adjust the upsampled data 225 to derive the adjusted upsampled data 240. For example, the adjustment data 235 may comprise an additive correction to be applied to the upsampled data 240. In other examples, the upsampled data 225 is applied to the adjustment data 235 to derive the adjusted upsampled data 240.

In some examples, for example when the signal processing technique 200 is performed by the encoder device 108, the adjusted representation 240 is used to derive residual data. The residual data is useable by the decoder device 110 to reconstruct the reference representation using the adjusted representation 240. The residual data may be derived by comparing the adjusted representation 240 with the reference representation. In some examples, the residual data is derived by calculating a difference between the adjusted representation 240 and the reference representation. The comparison between the reference representation and the adjusted representation 240 that is used to determine the residual data may be reversed, e.g. at the decoder device 110, such that the reference representation can be obtained by comparing the adjusted representation 240 with the residual data.

Output data may be generated by the encoder device 108. The output data is useable by the decoder device 110 to derive the input data 210. The data useable to derive the input data 210 may comprise the input data 210 itself. In some examples, the data useable to derive the input data 210 comprises data from one or more lower levels of quality relative to the first level of quality which may be used by the decoder device 110 to obtain the input data 210. The output data is also useable by the decoder device 110 to derive the residual data. The output data may be encoded for transmission to the decoder device 110 to allow the decoder device 110 to reconstruct the reference representation. For example, the output data may be transmitted as a compressed data stream via data communications network 106. The output data may be encoded prior to transmission to reduce the amount of data involved in transmitting the output data to the decoder device 110.

In some examples, for example when the signal processing technique 200 is performed by the decoder device 110, data useable to derive the residual data is received. The data useable to derive the residual data comprises the residual data or transformed residual data (collectively referred to herein as "residual data"), encoded residual data or other data useable by the decoder device 110 to derive the residual data. The data useable to derive the residual data may be received from the encoder device 108. The data useable to derive the residual data may be received as part of a compressed data stream. The data useable to derive the residual data may be received by the decoder device 110 along with data useable to obtain the input data 210. The decoder device 110 can use the residual data with the adjusted representation 240 to reconstruct the reference representation.

The use of the upsampling adjuster 230, which may be, for example, a convolutional neural network, to adjust the upsampled data 225, allows a greater level of control or influence over the residual data that is used for signal reconstruction compared to a case in which the upsampling adjuster 230 is not used. The adjusted representation 240 may be more similar to the reference representation than the upsampled data 225 is. The difference between the adjusted representation 240 and the reference representation may thus be smaller than the difference between the upsampled data 225 and the reference representation. As such, adjusting the upsampled data 225 may reduce a size of the resulting residual data useable to reconstruct the reference representation. Additionally or alternatively, adjusting the upsampled data 225 using the upsampling adjuster 230 may enable the residual data to be encoded more efficiently. For example, adjusting the upsampled data 225 using the upsampling adjuster 230 may reduce a coding entropy of the residual data. In some examples, fewer unique symbols may be used to represent the residual data compared to a case in which the upsampling adjuster 230 is not used, thus improving coding efficiency.

In some examples, the adjustment data derived at the encoder device 108 is not output to the decoder device 110. There may be a known relationship between a configuration of the encoder device 108 and a configuration of the decoder device 110. For example, the decoder device 110 may comprise an upsampling adjuster that is configured in a similar manner to the upsampling adjuster at the encoder device 108. Therefore, the upsampling adjuster at the decoder device 110 may derive adjustment data independently, without the need for the decoder device 110 to receive adjustment data from the encoder device 108.

In some examples, the upsampling adjuster 230 is arranged to achieve a target encoding property for the residual data. The target encoding property may comprise an entropy such as Shannon entropy. In some examples, the target encoding property relates to the values of the residual data. For example, it may be desired to reduce or minimise such values, and/or it may be desired to reduce variance between values of different residual data elements.

In this example, the upsampling adjuster 230 is arranged in parallel with the upsampler 220. This design is especially effective, since the upsampling adjuster 230 may be used to supplement an existing upsampler, by effectively providing the upsampler 220 with enhanced functionality. The upsampling adjuster 230 may be incorporated retrospectively into a system comprising the upsampler 220, thereby reducing a need to construct a new upsampler which includes the functionality of the upsampling adjuster 230, and increasing the useable lifespan of the upsampler 220. Further, applying an upsampling adjuster to an existing upsampler increases a flexibility of the signal processing system, since different parts of the system may be controlled, enabled and/or disabled independently. Moreover, in examples where the upsampling adjuster 230 comprises an artificial neural network, the existing upsampler 220 provides guidance during training of the artificial neural network. For example, the existing upsampler 220 may provide a "starting point" for training of the artificial neural network, and thus facilitate an increase in efficiency and/or accuracy of the artificial neural network.

Figure 3:
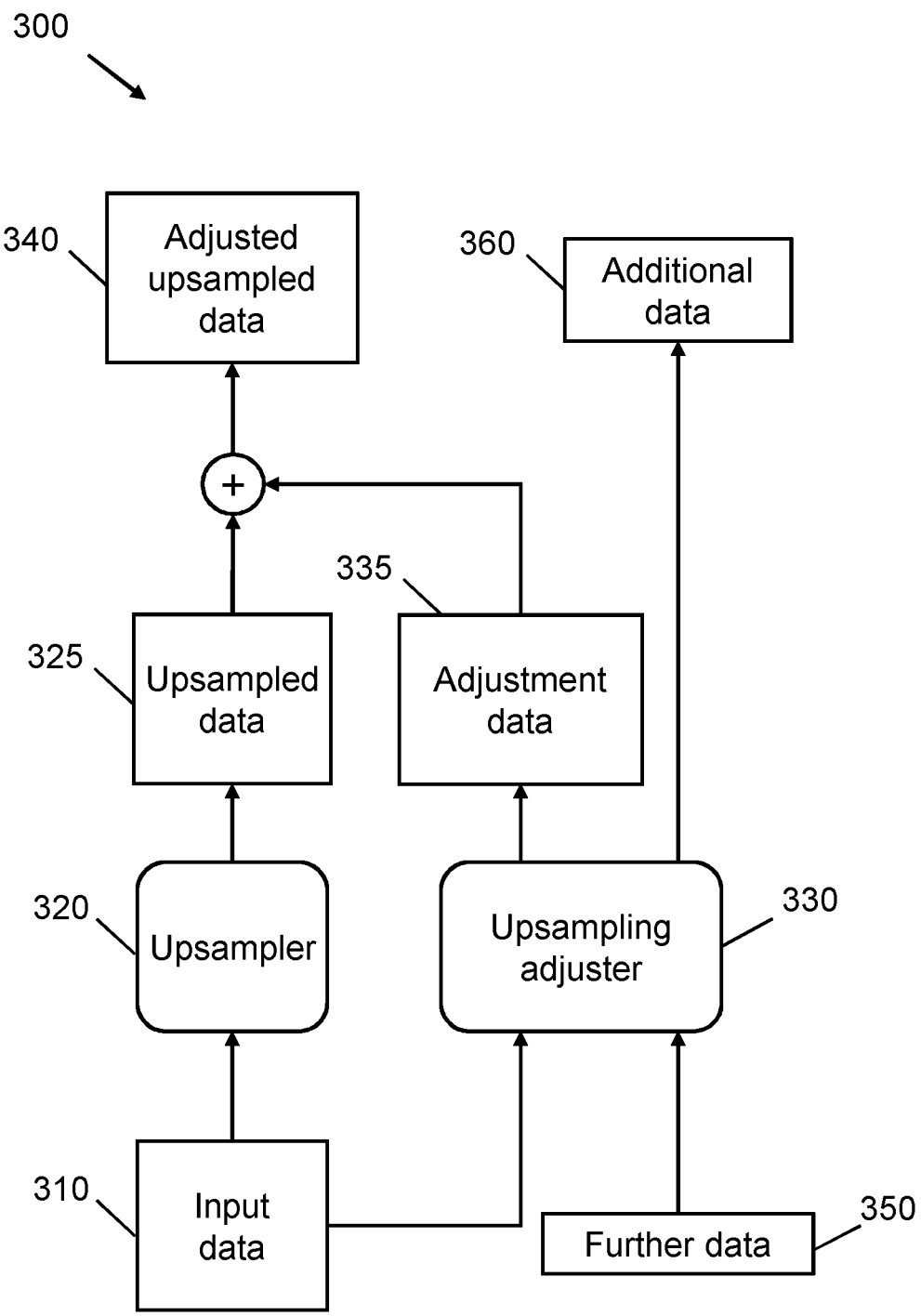
FIG. 3 shows a schematic diagram of another example of a signal processing technique in accordance with an embodiment of the present invention.

Referring to FIG. 3, there is shown schematically an example of a signal processing technique 300. The signal processing technique 300 may be performed by the encoder device 108 and/or the decoder device 110. Some items depicted in FIG. 3 are the same as or similar to items shown in FIG. 2. Corresponding reference signs, incremented by 100, have therefore been used for the same or similar items.

In this example, the upsampling adjuster 330 receives as a first input the input data 310, namely a representation of the signal at the first level of quality. The upsampling adjuster 330 also receives further data 350 as a second input. The further data 350 may be associated with the first level of quality.

In this example, the further data 350 comprises data derived using a further upsampling adjuster (not shown). The further upsampling adjuster may be arranged in the apparatus performing the signal processing technique 300. The further upsampling adjuster is associated with a further upsampler (not shown). The further upsampler is used to upsample a representation of the signal at the level of quality lower than the first level of quality. The data derived using the further upsampling adjuster can be used to steer or guide the upsampling adjuster 330 in deriving the adjustment data 335.

In some examples, the further data 350 is received from the further upsampling adjuster. In other examples, the further data 350 is retrieved from memory.

The further upsampling adjuster may use machine learning. For example, the further upsampling adjuster may comprise an artificial neural network such as a convolutional neural network. The further upsampling adjuster may be separate from the upsampling adjuster 330. The further upsampling adjuster is operable to derive adjustment data useable to adjust a preliminary representation of the signal at the first level of quality derived by upsampling the representation of the signal at the level of quality lower than the first level of quality.

As such, the arrangement of the upsampler 320 and upsampling adjuster 330 shown in FIG. 3 for a given level of quality may also be provided at one or more other levels of quality. For example, a corresponding upsampler and upsampling adjuster may be provided at a lower level of quality.

In some examples, the upsampling adjuster 330 and the further upsampling adjuster comprise artificial neural networks arranged to operate on representations of the signal at different levels of quality. The signal processing technique 300 may thus involve linking artificial neural networks that are associated with different levels of quality. Information can thus be shared between the artificial neural networks that are associated with different levels of quality. Sharing information between the artificial neural networks may improve an accuracy and/or a processing efficiency of one or both of the artificial neural networks. Such an effect is in addition to that achieved by the use of the upsampling adjuster 330 per se, namely enabling additional control of the residual data. In some examples, for example where the upsampling adjuster 330 and the further upsampling adjuster comprise artificial neural networks, the further data 350 comprises data output from the further upsampling adjuster. In an example, the further data 350 comprises intermediate data used by the further upsampling adjuster in the process of deriving adjustment data. For example, the further data 350 may comprise one or more kernels, filters, parameters, weights or the like, used by the further upsampling adjuster.

In examples where the upsampling adjuster 330 and the further upsampling adjuster comprise convolutional neural networks, a convolutional filter used by the further upsampling adjuster may be proportionally bigger than a convolutional filter used by the upsampling adjuster 330. This is due to the further upsampling adjuster operating on a lower level of quality representation of the signal than that which the upsampling adjuster 330 operates on.

Linking the neural networks is particularly advantageous. Since neural networks perform better the "deeper" they are (i.e., the more levels in the neural network, the better they will perform), it may therefore be desirable to try to maximise the depth. However, the deeper the neural network, the more computationally costly they are, thus making them impractical for real-time processing (such as that needed for live video) or for devices which do not possess the necessary computational capabilities. As such, conventional neural networks may be difficult to use in applications such as video processing. Nevertheless, the design proposed in the present invention which links together multiple independent neural networks means that the neural networks working at higher levels are effectively as deep as the stack of linked neural networks, thus effectively leveraging on the knowledge generated by the neural networks at the lower levels. For example, if the neural network working at a first level in the hierarchy has three edge levels, and the neural network working at the second level in the hierarchy has three edge levels, and the two neural networks are linked, the neural network working at the second level in the hierarchy has effectively six edge levels, thus doubling its depth with no additional computational cost. As such, the effective depth of the neural network at the second level of quality is enhanced by linking it with the neural network at the first level of quality. Therefore, by linking neural networks associated with different hierarchical levels of quality, the hierarchical nature of the signal processing arrangement is exploited in order to share information between the neural networks. In some examples, linking the neural networks reduces the effects of undesired transform-related artefacts in the reconstructed signal.

As such, a neural network may be used for upsampling as part of an encoding/decoding process. This use of a neural network is different than use of a neural network for obtaining super-resolution images. In other words, artificial neural networks are used herein in the context of an encoding/decoding pipeline.

In some examples, the further data 350 comprises upsampler attribute data. The upsampler attribute data indicates an attribute of the upsampler 320. For example, the further data 350 may comprise data indicating a type of upsampling and/or one or more upsampling parameters used by the upsampler 320.

In some examples, the further data 350 comprises signal attribute data. The signal attribute data indicates an attribute of the signal and/or of the input data 310. For example, where the signal comprises an image, the further data 350 may comprise data indicating one or more image parameters or characteristics which may influence the upsampling adjuster 330.

In this example, if there is a second level of quality which also uses an upsampling adjuster, the upsampling adjuster 330 may output additional data 360. The additional data 360 is useable by an upsampling adjuster associated with an upsampler used to upsample a representation of the signal at the second level of quality. As such, the upsampling adjuster 330 may generate data to be fed into another upsampling adjuster associated with a higher level of quality. The additional data 360 may be sent to the upsampling adjuster associated with the higher level of quality, or may be stored in memory for subsequent use by that upsampling adjuster. Where the upsampling adjuster 330 comprises an artificial neural network, the additional data 360 may comprise an additional output of the artificial neural network which can be used to guide another artificial neural network associated with the higher level of quality.

In some examples, the additional data 360 output from the upsampling adjuster 330 is information derived from the process of upsampling the representation at the first level of quality using the upsampling adjuster 330. The additional data 360 is useable by an upsampling adjuster associated with the higher level of quality to improve the accuracy of the upsampling adjuster associated with the higher level of quality, due to the sharing of information between upsampling adjusters associated with different levels of quality.

In some examples, an upsampler and corresponding upsampling adjuster are provided at each level of quality in a tiered hierarchy. In such examples, the upsampling adjuster at a given level of quality is linked with an upsampling adjuster at a next lower level of quality and with an upsampling adjuster at a next higher level of quality. As such, information may be shared between upsampling adjusters at different hierarchical levels, in order to improve an accuracy of upsampling adjustment and/or to improve an efficiency of processing using the upsampling adjusters.

In some examples, for example where a given upsampling adjuster comprises an artificial neural network, the hierarchical nature of the signal processing arrangement is exploited by providing inter-linked neural networks at multiple levels of quality in the hierarchy. The neural networks (which together may be considered an overall neural network architecture) may have an overall target function of optimisation that corresponds to a sum of errors per level of quality in the hierarchy, rather than an error at the topmost level of quality only. Such a neural network architecture may provide a "step-by-step" or "level-by-level" criterion which facilitates efficient and accurate training of the neural networks, since neural networks at different levels of quality are able to share information and therefore guide each other during optimisation. Such a "step-by-step" criterion may provide more effective training than a case in which the neural networks are not linked, or a case in which only the topmost level of quality in the hierarchy has an artificial neural network.

Figure 4:
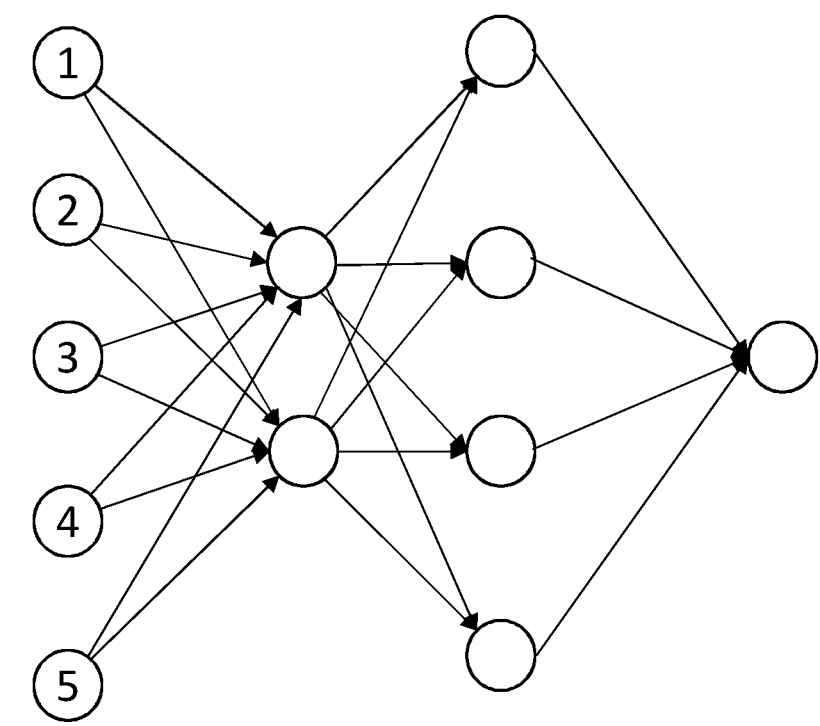
FIG. 4 shows a schematic diagram of an example of a convolutional neural network.

Referring to FIG. 4, there is shown a schematic diagram of an example of a convolutional neural network (CNN) 400. The CNN 400 may be used in accordance with the signal processing methods described herein. In some examples, different convolutional neural networks operate at different levels of signal quality in a tiered hierarchy having multiple levels of quality. In this example, the convolutional neural network 400 comprises four layers, namely an input layer, two hidden layers, and an output layer. Each layer comprises one or more nodes, which may referred to as "neurons". In this example, the input layer comprises 5 neurons and the output layer comprises 1 neuron. The neurons in the convolutional neural network 400 may be arranged in three dimensions (width, height, depth). For an image input, the depth dimension may be the number of colour channels of the image, for example. Each of the neurons may have one or more learnable weights, or "biases", that may be adjusted during training. A set of one or more weights for a given neuron may be referred to as a "filter" or "kernel", which is convolved with the input image to produce an output. The CNN 400 will typically also include a patch extraction and representation component, for processing input data at a lower, input level of quality, and an reconstruction component, for generating output data at a higher, output level of quality.

Figure 5:
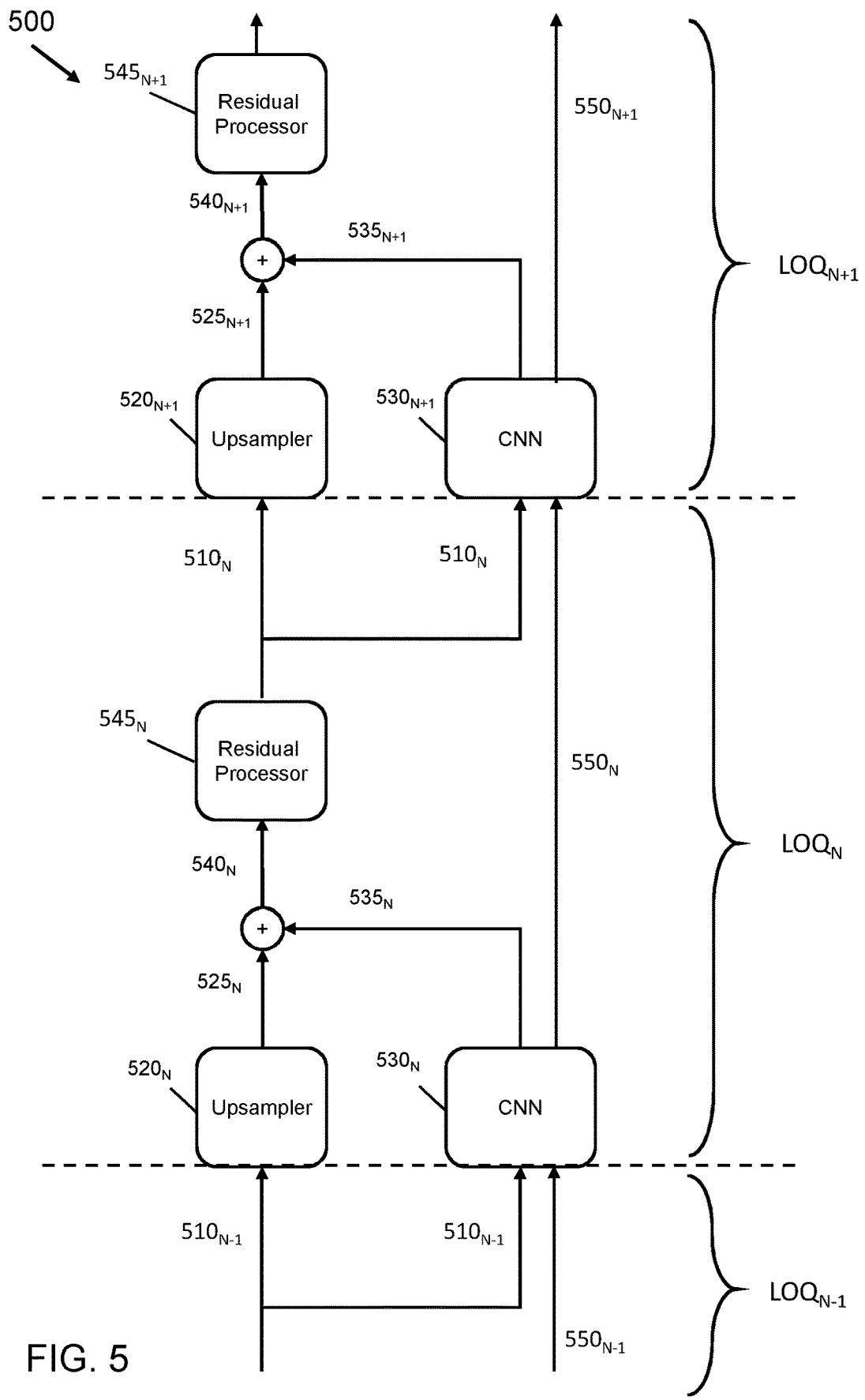
FIG. 5 shows a schematic diagram of another example of a signal processing technique in accordance with an embodiment of the present invention.

Referring to FIG. 5, there is shown schematically an example of a signal processing technique 500. The signal processing technique 500 may be performed by the encoder device 108 and/or the decoder device 110. Some items depicted in FIG. 5 are the same as or similar to items shown in FIG. 3. Corresponding reference signs, incremented by 200, have therefore been used for the same or similar items. The signal processing technique 500 may include CNNs such as that described in relation to FIG. 4, used as upsampling adjusters.

As shown in FIG. 5, in this example an upsampler $520_N$, a CNN $530_N$ and a residual processor $545_N$ are provided for generating signals at a given level of quality ($LOQ_N$). This arrangement of components may also be provided at one or more lower levels of quality and/or one or more higher levels of quality. For example, a corresponding upsampler (not shown), CNN (not shown) and residual processor (not shown) may be provided at a lower level of quality ($LOQ_{N-1}$). Alternatively, or in addition, a corresponding upsampler $520_{N+1}$, CNN $530_{N+1}$ and residual processor $545_{N+1}$ may be provided at a higher level of quality ($LOQ_{N+1}$).

In this example, a CNN $530_N$ is arranged to operate as an upsampling adjuster which receives as a first input data $510_{N-1}$, namely a representation of the signal at a first level of quality ($LOQ_{N-1}$). The upsampling adjuster CNN $530_N$ also receives further input data $550_{N-1}$ as a second input. The further input data $550_{N-1}$ may be associated with the first level of quality. The upsampling adjuster CNN $530_N$ generates adjustment data $535_N$ at a second level of quality ($LOQ_N$), which may for example be at twice the resolution of the first level of quality. The upsampling adjuster CNN $530_N$ also generates adjustment further output data $550_N$ as a second output. The further output data $550_N$ may be associated with the second level of quality.

In an example, the further input data $550_{N-1}$ comprises data derived using a lower-level CNN (not shown) operating as an upsampling adjuster at the first level of quality ($LOQ_{N-1}$). The lower-level CNN is associated with a lower-level upsampler (not shown). The lower-level upsampler is used to upsample a representation of the signal at the level of quality lower than the first level of quality. The further input data $550_{N-1}$ derived using the lower-level CNN can be used to steer or guide the CNN $530_N$ in deriving the adjustment data $535_N$ and the further output data $550_N$.

Alternatively, if the first level of quality is the lowest level of quality in the signal processing technique 500, the further input data $550_{N-1}$ may not be provided.

In an example, the further output data $550_N$ comprises data derived using a CNN $530_N$ operating as an upsampling adjuster at the second level of quality ($LOQ_N$). The CNN $530_N$ is associated with upsampler $520_N$. The upsampler $520_N$ is used to upsample a representation of the signal at the first level of quality. The further output data $550_N$ derived using the CNN $530_N$ can be used to steer or guide a higher level CNN $530_{N+1}$ in deriving higher-level adjustment data $535_{N+1}$ and higher-level further output data $550_{N+1}$.

Alternatively, if the CNN $530_N$ is operating at the topmost level of quality, the further output data $550_N$ may not be generated.

In some examples, the further input data $550_{N-1}$ comprises latent representation data. The latent representation data indicates one or more attributes of the first input data $510_{N-1}$. For example, where the signal comprises an image, the further input data $550_{N-1}$ may comprise data indicating one or more image characteristics which may influence the CNN $530_N$. These data are derived using the lower-level CNN (not shown). The further input data $550_{N-1}$ may be provided as one or more channels of latent representation data from the lower-level CNN. Similarly, the further output data $550_N$ may be provided as one or more channels of latent representation data from the $CNN_N$. In some examples of the invention, the number of channels of further input data $550_{N-1}$ is greater than the number of channels of further output data $550_N$. This enable greater efficiency, since the amount of processing in a CNN associated with a higher level of quality can be correspondingly reduced.

The arrangement shown in FIG. 5 may be used for upsampling as part of an encoding/decoding process. When implemented in an encoder, the residual processor $545_N$ compares its input signal $540_N$ to a reference image associated with the level of quality ($LOQ_N$) at which the residual processor operates and generates a residual data signal (not shown) for transmission to a decoder, and the residual processor $545_N$ applies the residual data signal as a correction to the input signal to generate its output signal $510_N$. When implemented in a decoder, the residual processor $545_N$ corrects its input signal $540_N$ using a received residual data signal (not shown) associated with the level of quality ($LOQ_N$) at which the residual processor operates and generates its output signal $510_N$, which may optionally be output for display.

Figure 6:
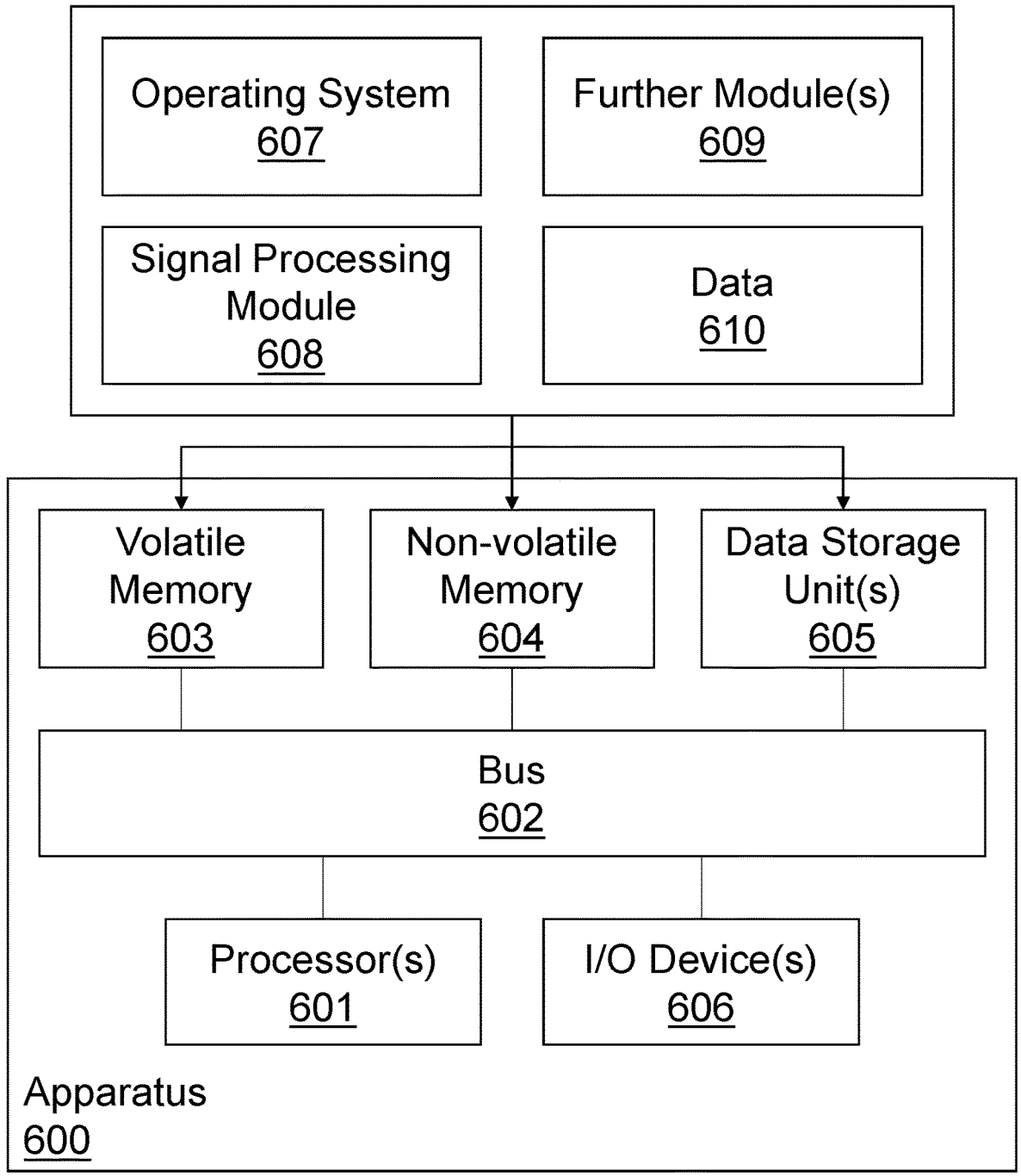
FIG. 6 shows a schematic block diagram of an example of an apparatus in accordance with an embodiment of the present invention.

Referring to FIG. 6, there is shown a schematic block diagram of an example of an apparatus 600.

In an example, the apparatus 600 comprises an encoder device. In another example, the apparatus 600 comprises a decoder device.

Other examples of apparatus 600 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, or in general any type of computing or electronic device.

In this example, the apparatus 600 comprises one or more processors 601 configured to process information and/or instructions. The one or more processors 601 may comprise a central processing unit (CPU). The one or more processors 601 are coupled with a bus 602. Operations performed by the one or more processors 601 may be carried out by hardware and/or software. The one or more processors 601 may comprise multiple co-located processors or multiple disparately located processors.

In this example, the apparatus 600 comprises computer-useable volatile memory 603 configured to store information and/or instructions for the one or more processors 601. The computer-useable volatile memory 603 is coupled with the bus 602. The computer-useable volatile memory 603 may comprise random access memory (RAM).

In this example, the apparatus 600 comprises computer-useable non-volatile memory 604 configured to store information and/or instructions for the one or more processors 601. The computer-useable non-volatile memory 604 is coupled with the bus 602. The computer-useable non-volatile memory 604 may comprise read-only memory (ROM).

In this example, the apparatus 600 comprises one or more data-storage units 605 configured to store information and/or instructions. The one or more data-storage units 605 are coupled with the bus 602. The one or more data-storage units 605 may for example comprise a magnetic or optical disk and disk drive or a solid-state drive (SSD).

In this example, the apparatus 600 comprises one or more input/output (I/O) devices 606 configured to communicate information to and/or from the one or more processors 601. The one or more I/O devices 606 are coupled with the bus 602. The one or more I/O devices 606 may comprise at least one network interface. The at least one network interface may enable the apparatus 600 to communicate via one or more data communications networks. Examples of data communications networks include, but are not limited to, the Internet and a Local Area Network (LAN). The one or more I/O devices 606 may enable a user to provide input to the apparatus 600 via one or more input devices (not shown). The one or more input devices may include for example a remote control, one or more physical buttons etc. The one or more I/O devices 606 may enable information to be provided to a user via one or more output devices (not shown). The one or more output devices may for example include a display screen.

Various other entities are depicted for the apparatus 600. For example, when present, an operating system 607, signal processing module 608, one or more further modules 609, and data 610 are shown as residing in one, or a combination, of the computer-usable volatile memory 603, computer-usable non-volatile memory 604 and the one or more data-storage units 605. The signal processing module 608 may be implemented by way of computer program code stored in memory locations within the computer-usable non-volatile memory 604, computer-readable storage media within the one or more data-storage units 605 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a signal processing module 608 which can be executed by the one or more processors 601. The signal processing module 608 can be configured to include instructions to implement at least some of the operations described herein. During operation, the one or more processors 601 launch, run, execute, interpret or otherwise perform the instructions in the signal processing module 608.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 600 may comprise more, fewer and/or different components from those depicted in FIG. 6.

The apparatus 600 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

Various measures (for example apparatuses, methods, computer programs and computer-readable media) are provided in which a representation of a signal at a first level of quality is obtained by an encoder device. The representation at the first level of quality is upsampled using an upsampler in the encoder device to derive a preliminary representation of the signal at a second, higher level of quality. Adjustment data is derived using the representation at the first level of quality as an input to an upsampling adjuster arranged in parallel with the upsampler in the encoder device, the adjustment data being useable by the encoder device to adjust the preliminary representation. The preliminary representation and the adjustment data are used to derive an adjusted representation of the signal at the second level of quality. The adjusted representation is used to derive residual data useable by a decoder device to reconstruct a reference representation of the signal at the second level of quality using the adjusted representation.

In some examples, the encoder device outputs data useable by the decoder device to derive the representation at the first level of quality and data useable by the decoder device to derive the residual data.

Various measures (for example apparatuses, methods, computer programs and computer-readable media) are provided in which a decoder device obtains a representation of a signal at a first level of quality. The representation at the first level of quality is upsampled using an upsampler in the decoder device to derive a preliminary representation of the signal at a second, higher level of quality. Adjustment data is derived using the representation at the first level of quality as an input to an upsampling adjuster arranged in parallel with the upsampler in the decoder device, the adjustment data being useable by the decoder device to adjust the preliminary representation. The preliminary representation and the adjustment data are used to derive an adjusted representation of the signal at the second level of quality. Data useable to derive residual data is received by the decoder device. The residual data is useable by the decoder device to reconstruct a reference representation of the signal at the second level of quality using the adjusted representation. The decoder device derives the residual data using the received data. The decoder device reconstructs the reference representation using the adjusted representation and the residual data.

In some examples, deriving the adjustment data comprises using further data as a further input to the upsampling adjuster.

In some examples, the further data comprises data derived using a further upsampling adjuster. The further upsampling adjuster is associated with a further upsampler used to upsample a representation of the signal at a level of quality lower than the first level of quality.

In some examples, the upsampling adjuster uses machine learning to derive the adjustment data.

In some examples, the upsampling adjuster comprises a trained artificial neural network.

In some examples, the upsampling adjuster comprises a convolutional neural network.

In some examples, the upsampling adjuster is arranged to achieve a target encoding property for the residual data.

In some examples, the upsampling adjuster comprises an upsampling compensator.

In some examples, using the upsampling adjuster comprises outputting data useable by an upsampling adjuster associated with an upsampler used to upsample a representation of the signal at the second level of quality.

Various measures (for example apparatuses, methods, computer programs and computer-readable media) are provided in which an encoder device obtains a representation of a signal at a first level of quality. The encoder device upsamples the representation at the first level of quality using an upsampler in the encoder device to derive a preliminary representation of the signal at a second, higher level of quality. The encoder device derives adjustment data useable by the encoder device to adjust the preliminary representation. The adjustment data is derived using the representation at the first level of quality as a first input to an upsampling adjuster in the encoder device. The adjustment data is derived using further data as a second input to the upsampling adjuster. The further data comprises data derived using a further upsampling adjuster in the encoder device. The further upsampling adjuster is associated with a further upsampler used to upsample a representation of the signal at a level of quality lower than the first level of quality. The encoder device uses the preliminary representation and the adjustment data to derive an adjusted representation of the signal at the second level of quality. The encoder device uses the adjusted representation to derive residual data useable by a decoder device to reconstruct a reference representation at the second level of quality using the adjusted representation. The encoder device outputs data useable by the decoder device to derive the representation at the first level of quality and data useable by the decoder device to derive the residual data.

Various measures (for example apparatuses, methods, computer programs and computer-readable media) are provided in which a decoder device obtains a representation of a signal at a first level of quality. The decoder device upsamples the representation at the first level of quality using an upsampler in the decider device to derive a preliminary representation of the signal at a second, higher level of quality. The decoder device derives adjustment data useable by the decoder device to adjust the preliminary representation. The adjustment data is derived using the representation at the first level of quality as a first input to an upsampling adjuster in the decoder device. The adjustment data is derived using further data as a second input to the upsampling adjuster. The further data comprises data derived using a further upsampling adjuster in the decoder device. The further upsampling adjuster is associated with a further upsampler used to upsample a representation of the signal at a level of quality lower than the first level of quality. The decoder device uses the preliminary representation and the adjustment data to derive an adjusted representation of the signal at the second level of quality. The decoder device receives data useable to derive residual data. The residual data is useable by the decoder device to reconstruct a reference representation of the signal at the second level of quality. The decoder device derives the residual data using the received data. The decoder device reconstructs the reference representation using the adjusted representation and the residual data.

In some examples, the further data comprises upsampler attribute data indicating an attribute of the upsampler.

In some examples, the further data comprises signal attribute data indicating an attribute of the representation of the signal at the first level of quality.

Various measures (for example apparatuses, methods, computer programs and computer-readable media) are provided in which an encoder device obtains a representation of a signal at a first level of quality. The encoder device upsamples the representation at the first level of quality using a first up sampler in the encoder device to derive a first preliminary representation of the signal at a second, higher level of quality. The encoder device derives first adjustment data using the representation at the first level of quality as an input to a first up sampling adjuster arranged in parallel with the first upsampler in the encoder device. The first adjustment data is useable by the encoder device to adjust the preliminary representation. The encoder device uses the first preliminary representation and the first adjustment data to derive a first adjusted representation of the signal at the second level of quality. The encoder device derives, using the first adjusted representation, first residual data useable by a decoder device to reconstruct a reference representation of the signal at the second level of quality using the first adjusted representation. The encoder device uses the first adjusted representation and the first residual data to reconstruct the reference representation at the second level of quality. The encoder device then upsamples the reference representation at the second level of quality using a second upsampler in the encoder device to derive a second preliminary representation of the signal at a third level of quality. The third level of quality is higher than the second level of quality. The encoder device derives second adjustment data using the reference representation at the second level of quality and data output from the first upsampling adjuster as inputs to a second upsampling adjuster arranged in parallel with the second upsampler in the encoder device. The second adjustment data is useable by the encoder device to adjust the second preliminary representation. The encoder device uses the second preliminary representation and the second adjustment data to derive a second adjusted representation of the signal at the third level of quality. The encoder device uses the second adjusted representation to derive second residual data. The second residual data is useable by a decoder device to reconstruct a reference representation of the signal at the third level of quality using the second adjusted representation.

In some examples, the encoder device outputs data useable by the decoder device to derive the representation at the first level of quality, data useable by the decoder device to derive the first residual data, and data useable by the decoder device to derive the second residual data.

Various measures (for example apparatuses, methods, computer programs and computer-readable media) are provided in which a decoder device obtains a representation of a signal at a first level of quality. The decoder device upsamples the representation at the first level of quality using a first upsampler in the decoder device to derive a first preliminary representation of the signal at a second, higher level of quality. The decoder device derives first adjustment data using the representation at the first level of quality as an input to a first up sampling adjuster arranged in parallel with the first upsampler in the decoder device. The first adjustment data is useable by the decoder device to adjust the preliminary representation. The decoder device uses the first preliminary representation and the first adjustment data to derive a first adjusted representation of the signal at the second level of quality. The decoder device receives first data useable by the decoder device to derive first residual data useable by the decoder device to reconstruct a reference representation of the signal at the second level of quality using the first adjusted representation. The decoder device derives the first residual data using the received first data. The decoder device reconstructs the reference representation at the second level of quality using the first adjusted representation and the first residual data. The decoder device then upsamples the reference representation at the second level of quality using a second upsampler in the decoder device to derive a second preliminary representation of the signal at a third level of quality. The third level of quality is higher than the second level of quality. The decoder device derives second adjustment data using the reference representation at the second level of quality and data output from the first upsampling adjuster as inputs to a second upsampling adjuster arranged in parallel with the second upsampler in the decoder device. The second adjustment data is useable by the decoder device to adjust the second preliminary representation. The decoder device uses the second preliminary representation and the second adjustment data to derive a second adjusted representation of the signal at the third level of quality. The decoder device receives second data useable by the decoder device to derive second residual data useable by the decoder device to reconstruct a reference representation of the signal at the third level of quality using the second adjusted representation. The decoder device derives the second residual data using the received second data. The decoder device reconstructs the reference representation at the third level of quality using the second adjusted representation and the second residual data.

In some examples, the data output from the first upsampling adjuster is information derived from the process of upsampling the representation at the first level of quality using the first upsampling adjuster and is useable by the second upsampling adjuster to improve the accuracy of the second up sampling adjuster.

In some examples, the second upsampling adjuster comprises a neural network, and the data output from the first upsampling adjuster is used as a data input to the neural network.

In some examples, the first upsampling adjuster comprises a neural network.

In some examples, the first upsampling adjuster and/or the second upsampling adjuster comprises a convolutional neural network.

Various measures (for example apparatuses, methods, computer programs and computer-readable media) are provided in which an encoder device obtains a representation of a signal at a first level of quality, the representation at the first level of quality having been derived using a reference representation of the signal at a second, higher level of quality. The representation at the first level of quality is upsampled using an upsampler in the encoder device to derive a preliminary representation of the signal at the second level of quality. Adjustment data is derived, using the representation at the first level of quality as an input to an upsampling adjuster in the encoder device. The upsampling adjuster and the upsampler are separate elements of the encoder device. The adjustment data is useable by the encoder device to adjust the preliminary representation. The preliminary representation and the adjustment data are used to derive an adjusted representation of the signal at the second level of quality. The adjusted representation is used to derive residual data useable by a decoder device to reconstruct the reference representation using the adjusted representation. Data is output that is useable by the decoder device to derive the representation at the first level of quality and the residual data. Use of the adjuster and the adjustment data facilitates control of the residual data.

The above embodiments are to be understood as illustrative examples. Further embodiments are envisaged.

In some examples described herein the upsampler and the upsampling adjuster are arranged in parallel in the encoder device or decoder device. In other examples, the upsampler and the upsampling adjuster are arranged in a different configuration. For example, the upsampler and the upsampling adjuster may be arranged in series. As such, the upsampling adjuster may receive as an input data derived using the upsampler. In other examples, the upsampler and the upsampling adjuster are combined. As such, the upsampler and the upsampling adjuster may be comprised in a single physical or logical component. For example, such a combined component may comprise a trained artificial neural network that performs both upsampling and upsampling adjustment. Using a combined upsampler and upsampling adjuster may reduce an amount of processing power, logic, storage space used, complexity and/or cost compared to a case in which a separate upsampler and upsampling adjuster are used, in some cases.

In some examples, the adjustment data derived by the upsampling adjuster is combined with the input data to derive adjusted input data. The adjusted input data may then be input to the upsampler. For example, the input data may be modified based on a knowledge of how the upsampler will process the input data to generate the upsampled data. Such knowledge may be acquired through training, for example where the upsampling adjuster comprises an artificial neural network. When the adjustment data is applied to the input data rather than the higher resolution upsampled data in such examples, the resolution of the adjustment data may be lower than a case in which the adjustment data is applied to the upsampled data. A processing efficiency may therefore be improved compared to a case in which higher resolution adjustment data is combined with the higher resolution upsampled data.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of processing signal data at an encoder device, the method comprising:
   obtaining a representation of a signal at a first level of quality, the signal including one of a video signal, an audio signal, an image signal, a holographic signal, a volumetric signal, or a multidimensional signal;
   upsampling the representation at the first level of quality using a first upsampler in the encoder device to derive a first preliminary representation of the signal at a second, higher level of quality;
   deriving first adjustment data using the representation at the first level of quality as an input to a first upsampling adjuster arranged in parallel with the first upsampler in the encoder device, the first adjustment data being useable by the encoder device to adjust the first preliminary representation;
   using the first preliminary representation and the first adjustment data to derive a first adjusted representation of the signal at the second level of quality;
   deriving, using the first adjusted representation, first residual data useable by a decoder device to reconstruct a reference representation of the signal at the second level of quality using the first adjusted representation;
   using the first adjusted representation and the first residual data, reconstructing the reference representation at the second level of quality;

upsampling the reference representation at the second level of quality using a second upsampler in the encoder device to derive a second preliminary representation of the signal at a third level of quality, higher than the second level of quality;

deriving second adjustment data using the reference representation at the second level of quality and data output from the first upsampling adjuster as inputs to a second upsampling adjuster arranged in parallel with the second upsampler in the encoder device, the second adjustment data being useable by the encoder device to adjust the second preliminary representation;

using the second preliminary representation and the second adjustment data to derive a second adjusted representation of the signal at the third level of quality; and deriving, using the second adjusted representation, second residual data useable by a decoder device to reconstruct a reference representation of the signal at the third level of quality using the second adjusted representation.

2. A method according to claim 1, the method comprising:
outputting data useable by the decoder device to derive:
the representation at the first level of quality;
the first residual data; and
the second residual data.

3. A method of processing signal data at a decoder device, the method comprising:
obtaining a representation of a signal at a first level of quality, the signal including one of a video signal, an audio signal, an image signal, a holographic signal, a volumetric signal, or a multidimensional signal;

upsampling the representation at the first level of quality using a first upsampler in the decoder device to derive a first preliminary representation of the signal at a second, higher level of quality;

deriving first adjustment data using the representation at the first level of quality as an input to a first upsampling adjuster arranged in parallel with the first upsampler in the decoder device, the first adjustment data being useable by the decoder device to adjust the first preliminary representation;

using the first preliminary representation and the first adjustment data to derive a first adjusted representation of the signal at the second level of quality;

receiving first data useable by the decoder device to derive first residual data useable by the decoder device to reconstruct a reference representation of the signal at a second, higher level of quality using the first adjusted representation;

deriving the first residual data using the received first data;

reconstructing the reference representation at the second level of quality using the first adjusted representation and the first residual data;

upsampling the reference representation at the second level of quality using a second upsampler in the decoder device to derive a second preliminary representation of the signal at a third level of quality, higher than the second level of quality;

deriving second adjustment data using the reference representation at the second level of quality and data output from the first upsampling adjuster as inputs to a second upsampling adjuster arranged in parallel with the second upsampler in the decoder device, the second adjustment data being useable by the decoder device to adjust the second preliminary representation;

using the second preliminary representation and the second adjustment data to derive a second adjusted representation of the signal at the third level of quality;

receiving second data useable by the decoder device to derive second residual data useable by the decoder device to reconstruct a reference representation of the signal at the third level of quality using the second adjusted representation;

deriving the second residual data using the received second data; and reconstructing the reference representation at the third level of quality using the second adjusted representation and the second residual data.

4. A method according to claim 3, wherein the data output from the first upsampling adjuster is information derived from the process of upsampling the representation at the first level of quality using the first upsampling adjuster and is useable by the second upsampling adjuster to improve the accuracy of the second upsampling adjuster.

5. A method according to claim 3, wherein the second upsampling adjuster comprises a neural network, and the data output from the first upsampling adjuster is used as a data input to the neural network.

6. A method according to claim 3, wherein the first upsampling adjuster comprises a neural network.

7. A method according to claim 3, wherein the first upsampling adjuster and/or the second upsampling adjuster comprises a convolutional neural network.

8. Apparatus configured to:
obtain a representation of a signal at a first level of quality, the signal including one of a video signal, an audio signal, an image signal, a holographic signal, a volumetric signal, or a multidimensional signal;

upsample the representation at the first level of quality using a first upsampler in the decoder device to derive a first preliminary representation of the signal at a second, higher level of quality;

derive first adjustment data using the representation at the first level of quality as an input to a first upsampling adjuster arranged in parallel with the first upsampler in the decoder device, the first adjustment data being useable by the decoder device to adjust the first preliminary representation;

use the first preliminary representation and the first adjustment data to derive a first adjusted representation of the signal at the second level of quality;

receive first data useable by the decoder device to derive first residual data useable by the decoder device to reconstruct a reference representation of the signal at a second, higher level of quality using the first adjusted representation;

derive the first residual data using the received first data;

reconstruct the reference representation at the second level of quality using the first adjusted representation and the first residual data;

upsample the reference representation at the second level of quality using a second upsampler in the decoder device to derive a second preliminary representation of the signal at a third level of quality, higher than the second level of quality;

derive second adjustment data using the reference representation at the second level of quality and data output from the first upsampling adjuster as inputs to a second upsampling adjuster arranged in parallel with the second upsampler in the decoder device, the second adjustment data being useable by the decoder device to adjust the second preliminary representation;

use the second preliminary representation and the second adjustment data to derive a second adjusted representation of the signal at the third level of quality;

receive second data useable by the decoder device to derive second residual data useable by the decoder device to reconstruct a reference representation of the signal at the third level of quality using the second adjusted representation;

derive the second residual data using the received second data; and reconstruct the reference representation at the third level of quality using the second adjusted representation and the second residual data.

9. A method according to claim 3, wherein the deriving of the first adjustment data comprises using further data as a further input to the first upsampling adjuster, the further data comprising upsampler attribute data indicating at least one of:

a type of upsampling performed using the first upsampler; or at least one upsampling parameter used by the first upsampler.

10. A method according to claim 3, wherein the signal comprises an image and the deriving of the first adjustment data comprises using further data as a further input to the first upsampling adjuster, the further data comprising signal attribute data indicating at least one of:

one or more image parameters of the image; or one or more image characteristics of the image.

11. A method according to claim 3, wherein the first upsampling adjuster and/or the second upsampling adjuster is arranged to achieve a target encoding property for the first residual data and/or the second residual data respectively, the target encoding property comprising an entropy for the first residual data and/or the second residual data.

12. A method according to claim 3, wherein the first upsampling adjuster and/or the second upsampling adjuster comprises an upsampling compensator to compensate for an upsampling property of the first upsampler and/or the second upsampler.

13. A method according to claim 3, wherein using the second upsampling adjuster comprises outputting data useable by an upsampling adjuster associated with a third upsampler to upsample a representation at the third level of quality.

* * * * *